US012775329B2

(12) United States Patent
Chen

(10) Patent No.: US 12,775,329 B2
(45) Date of Patent: Oct. 27, 2026

(54) INTERACTION METHOD, APPARATUS AND DISPLAY DEVICE

(71) Applicant: Goertek Inc., Shandong (CN)

(72) Inventor: Yongfu Chen, Shandong (CN)

(73) Assignee: Goertek Inc., Weifang (CN)

( * ) Notice: Subject to any disclaimer, the term of this patent is extended or adjusted under 35 U.S.C. 154(b) by 0 days.

(21) Appl. No.: 19/112,806

(22) PCT Filed: Aug. 8, 2023

(86) PCT No.: PCT/CN2023/111796

§ 371 (c)(1),
(2) Date: Mar. 18, 2025

(87) PCT Pub. No.: WO2024/066756

PCT Pub. Date: Apr. 4, 2024

(65) Prior Publication Data

US 2026/0099193 A1 Apr. 9, 2026

(30) Foreign Application Priority Data

Sep. 29, 2022 (CN) ........................ 202211213293.2

(51) Int. Cl.
*G06F 3/01* (2006.01)
*G06F 3/0346* (2013.01)
*G06F 3/04815* (2022.01)

(52) U.S. Cl.
CPC ............ *G06F 3/011* (2013.01); *G06F 3/0346* (2013.01); *G06F 3/04815* (2013.01)

(58) Field of Classification Search
CPC .... G06F 3/011; G06F 3/0346; G06F 3/04815; G06F 3/04845; G02B 27/0172
See application file for complete search history.

(56) References Cited

U.S. PATENT DOCUMENTS

| | | | | |
|---|---|---|---|---|
| 11,861,136 B1 * | 1/2024 | Faulkner | ............. | G06F 3/04815 |
| 2024/0029377 A1 * | 1/2024 | O'Leary | ............... | G06T 19/006 |

FOREIGN PATENT DOCUMENTS

| | | | | | |
|---|---|---|---|---|---|
| CN | 115494951 A | | 12/2022 | | |
| CN | 115576419 A | * | 1/2023 | .............. | G06F 3/011 |
| CN | 115617164 A | * | 1/2023 | .............. | G06F 3/011 |
| WO | WO 2020/250377 A1 | | 12/2020 | | |
| WO | WO 2021/033400 A1 | | 2/2021 | | |
| WO | WO-2022176450 A1 | * | 8/2022 | ........... | G06F 3/0346 |

OTHER PUBLICATIONS

Machine translation of WO 2022176450 (Year: 2022).*

* cited by examiner

*Primary Examiner* — Xuemei Zheng
(74) *Attorney, Agent, or Firm* — Baker Botts LLP

(57) ABSTRACT

The present disclosure discloses an interaction method, apparatus and a display device. The interaction method includes: acquiring posture information of a second device, wherein the posture information is configured to characterize a first direction representing an orientation of the second device; transforming the first direction to obtain a second direction; generating a virtual identifier according to the second direction, wherein the virtual identifier extends along the second direction and points to a display image of a first device; determining an intersection point between the virtual identifier and the display image within a preset first coordinate system, and displaying a preset icon at the intersection point.

11 Claims, 7 Drawing Sheets

INTERACTION METHOD, APPARATUS AND DISPLAY DEVICE

CROSS-REFERENCE TO RELATED APPLICATIONS

The present disclosure is a National Stage of International Application No. PCT/CN2023/111796, filed on Aug. 8, 2023, which claims priority to a Chinese patent application No. 202211213293.2 filed with the CNIPA on Sep. 29, 2022 and entitled "INTERACTION METHOD, APPARATUS AND DISPLAY DEVICE", both of which are hereby incorporated by reference in their entireties.

TECHNICAL FIELD

Embodiments of the present disclosure relate to the technical field of head-mounted displays, and particularly to an interaction method, apparatus and a display device.

BACKGROUND

With the continuous development of near-eye display device technology, the applications of near-eye display devices are becoming increasingly widespread, and people are placing higher demands on the interactive experience of these devices. To enhance user experience, near-eye display devices are often paired with external interaction devices, such as controllers or gloves.

However, on one hand, users must carry the external interaction devices during use, which is inconvenient and fails to meet the design requirements for lightweight and portability of the near-eye display devices. Additionally, the paired external interaction devices increase costs. On the other hand, the interaction approach between near-eye display devices and the external interaction devices is complex, leading to high operational difficulty and negatively impacting user experience.

SUMMARY

An embodiment of the present disclosure aims to provide an interaction method, apparatus and a display device.

According to a first aspect of the present disclosure, an interaction method is provided, including:

acquiring current posture information of a second device, wherein the current posture information is configured to characterize a first direction of the second device, with the first direction representing an orientation of the second device;

transforming the first direction to obtain a second direction;

generating a virtual identifier according to the second direction, wherein the virtual identifier extends along the second direction and points to a display image of a first device; and determining an intersection point between the virtual identifier and the display image within a preset first coordinate system, and displaying a preset icon at the intersection point.

Optionally, when a wireless streaming function is enabled, the display image of the first device corresponds to a display interface of the second device.

Optionally, after said "determining an intersection point between the virtual identifier and the display image within a preset first coordinate system, and displaying a preset icon at the intersection point", the method further includes:

acquiring first location information of the intersection point upon receiving a control instruction; and executing an interaction event triggered by the intersection point according to the first location information.

Optionally, said "acquiring current posture information of a second device" includes:

acquiring posture variation information and initial posture information of the second device, wherein the initial posture information is configured to characterize posture information of the second device being in a preset initial direction, and the posture variation information is configured to characterize posture information of variations of the second device relative to the initial direction; and determining the current posture information according to the posture variation information and the initial posture information.

Optionally, said "transforming the first direction to obtain a second direction" includes:

transforming the first direction according to a preset transformation relationship to obtain the second direction;

wherein the preset transformation relationship is a correspondence between a coordinate system of the first device in use and a coordinate system of the second device in use.

According to a second aspect of the present disclosure, an interaction apparatus is provided, including:

a first acquiring module for acquiring current posture information of a second device, wherein the current posture information is configured to characterize a first direction of the second device, with the first direction representing an orientation of the second device;

a transforming module for transforming the first direction to obtain a second direction;

a generating module for generating a virtual identifier according to the second direction, wherein the virtual identifier extends along the second direction and points to a display image of a first device; and a first determining module for determining an intersection point between the virtual identifier and the display image within a preset first coordinate system, and displaying a preset icon at the intersection point.

Optionally, the apparatus further includes:

a second acquiring module for acquiring first location information of the intersection point upon receiving a control instruction; and an executing module for executing an interaction event triggered by the intersection point according to the first location information.

Optionally, the first acquiring module is specifically configured for:

acquiring posture variation information and initial posture information of the second device, wherein the initial posture information is configured to characterize posture information of the second device being in a preset initial direction, and the posture variation information is configured to characterize posture information of variations of the second device relative to the initial direction; and determining the current posture information according to the posture variation information and the initial posture information.

Optionally, the transforming module is specifically configured for: transforming the first direction according to a preset transformation relationship to obtain the second direction;

wherein the preset transformation relationship is a correspondence between a coordinate system of the first device in use and a coordinate system of the second device in use.

According to a third aspect of the present disclosure, a display device is provided, which includes a communication module, wherein the display device further includes:

a memory for storing executable computer instructions;

a processor for executing the interaction method according to a first aspect of the present disclosure under control of the executable computer instructions;

wherein the communication module is configured for establishing a communication connection with an electronic device.

According to a fourth aspect of the present disclosure, a computer-readable storage medium is provided, wherein the computer-readable storage medium stores computer instructions that can be read and executed by a computer. The computer instructions, when run by a processor, execute the interaction method according to the first aspect of the present disclosure.

According to an embodiment of the present disclosure, by acquiring current posture information characterizing a first direction of the second device, transforming the first direction to obtain a second direction, generating and displaying a virtual identifier according to the second direction, determining an intersection point between the virtual identifier and the display image within a preset first coordinate system, and displaying a preset icon at the intersection point, in this way, it is possible to transform a user's operation on the second device into an actual rotation operation on the display image of the first device, enabling control of the display image of the first device via the second device. Moreover, by simulating the second device as a mouse for controlling the display image of the first device, usage becomes more convenient. Furthermore, embodiments of the present disclosure are not dependent on any specific scenario, allowing for global use and a broader range of applications.

Other features and advantages of the present disclosure will become apparent from the following detailed description of exemplary embodiments of the present disclosure with reference to the accompanying drawings.

BRIEF DESCRIPTION OF THE DRAWINGS

In order to clearly illustrate embodiments of the present disclosure or technical solutions in the prior art, a brief introduction to the drawings that will be used in the description of the embodiments or the prior art is provided below. Obviously, drawings in following description are only part of the drawings of the present disclosure. For those skilled in the art, other drawings can also be obtained according to the disclosed drawings without creative efforts.

DETAILED DESCRIPTION

The technical solutions in the embodiments of the present disclosure will be described below in conjunction with the accompanying drawings in the embodiments of the present disclosure. It is evident that the described embodiments are only a part of the embodiments of the present disclosure, and not all of them. Based on the embodiments in the present disclosure, all other embodiments obtained by a person of ordinary skills in the art without making creative labor fall within the scope of protection of the present disclosure.

Various exemplary embodiments of the present disclosure will now be described in detail with reference to the accompanying drawings. It is to be noted that unless otherwise specified, the relative arrangements, numerical expressions and values of components and steps illustrated in the embodiments do not limit the scope of the present disclosure.

The description of at least one exemplary embodiment is for illustrative purpose only and in no way implies any restriction on the present disclosure, its application, or use.

Techniques, methods and devices known to those skilled in the prior art may not be discussed in detail; however, such techniques, methods and devices shall be regarded as part of the description where appropriate.

In all the examples illustrated and discussed herein, any specific value shall be interpreted as illustrative rather than restrictive. Therefore, other examples of the exemplary embodiments may have different values.

It is to be noted that similar reference numbers and alphabetical letters represent similar items in the accompanying drawings. Once an item is defined in one drawing, further reference to it may be omitted in subsequent drawings.

Below, various embodiments and examples according to the present disclosure are described with reference to the accompanying drawings.

<Hardware Configuration>

Figure 1:
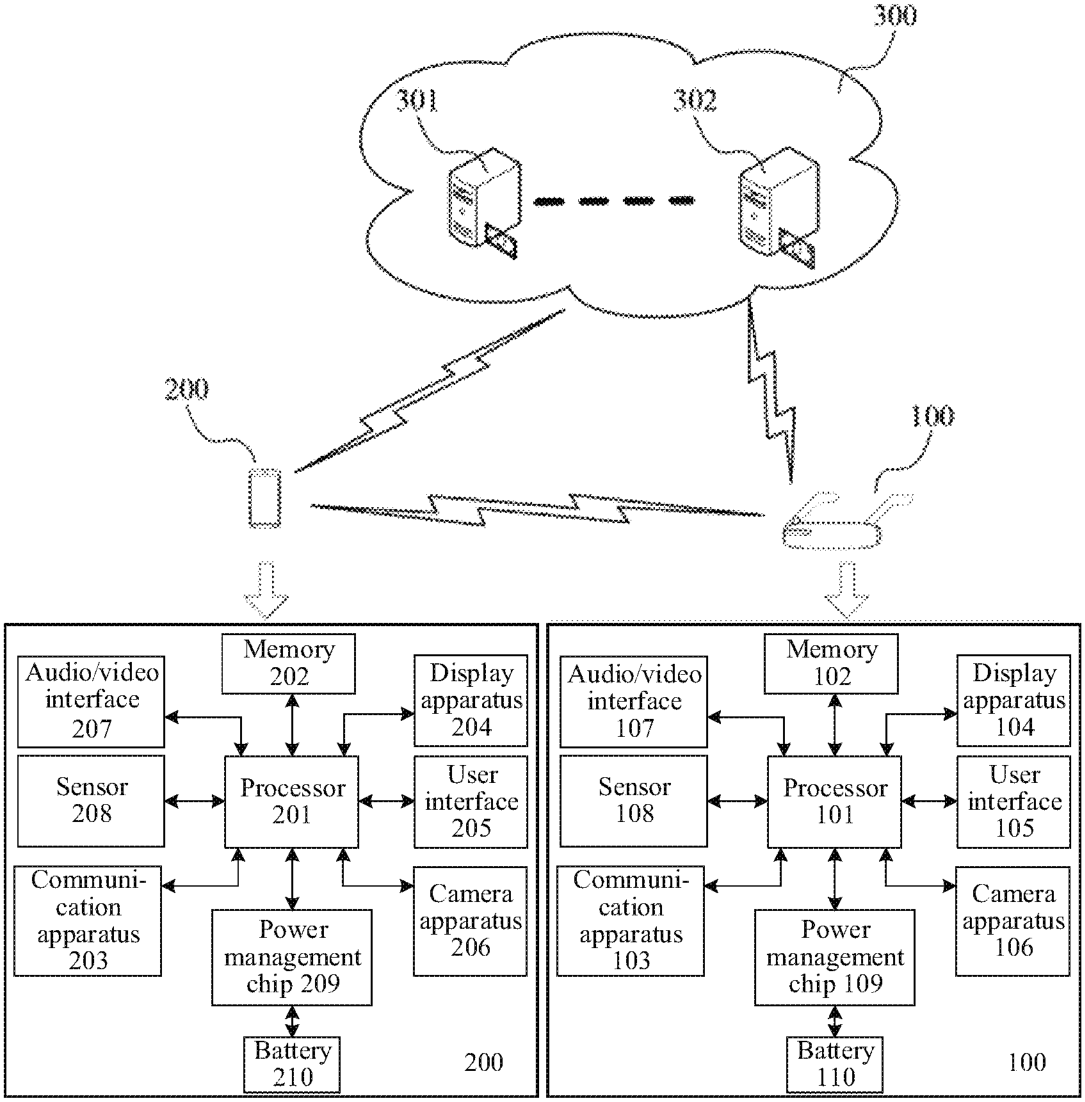
FIG. 1 is a schematic diagram of the hardware configuration of a display system that can be configured to implement an interaction method according to an embodiment.

FIG. 1 is a schematic diagram of the hardware configuration of a display system that can be configured to implement an interaction method according to an embodiment. FIG. 1 shows a first device 100, a second device 200, and a network 300. The first device 100 can be connected to the network 300 and can also be connected to the second device 200 via communication methods such as Bluetooth. In one embodiment, the first device 100 is only connected to the second device 200 via communication methods such as Bluetooth. Herein, a plurality of servers 301, 302 can be provided within the network 300. The network 300 can be a wireless communication network or a wired communication network. The network 300 can be a local area network or a wide area network. The network 300 can be short-range communication or long-distance communication.

In one embodiment, as shown in FIG. 1, the first device 100 may include a processor 101 and a memory 102. The first device 100 also includes a communication apparatus 103, a display apparatus 104, a user interface 105, a camera apparatus 106, an audio/video interface 107, and a sensor 108, etc. Moreover, the first device 100 may also include a power management chip 109 and a battery 110, etc.

Herein, the processor 101 can be any type of processor. The memory 102 can store underlying software, system software, application software, data, etc., required for the operation of the first device 100. The memory 102 can include various forms of memory such as ROM, RAM, Flash, etc. The communication apparatus 103 can include WiFi communication apparatus, Bluetooth communication apparatus, 3G, 4G, and 5G communication apparatus, etc. Through the communication apparatus 103, the first device 100 can be placed in the network. The display apparatus 104 can be an LCD, OLED display, etc. In one example, the display apparatus 104 can be a touchscreen. The user can perform input operations through the display apparatus 104. Furthermore, the user can use the touchscreen for fingerprint recognition, etc. The user interface 105 can include USB interfaces, lightning interfaces, keyboards, etc. The camera apparatus 106 can be a single camera or a multi-camera setup. The audio/video interface 107 can include speaker interfaces, microphone interfaces, video transmission interfaces such as HDMI, etc. The sensor 108 can include gyroscopes, accelerometers, temperature sensors, humidity sensors, pressure sensors, etc. For example, through sensors, the posture information of the first device can be determined. The power management chip 109 can be configured to manage the power supplied to the first device 100, and also manage the battery 110 to ensure maximum utilization efficiency. The battery 110 can be a lithium-ion battery, etc.

The first device 100 can be a near-eye display device, such as VR (Virtual Reality) glasses, AR (Augmented Reality) glasses, MR (Mixed Reality) glasses, etc., which is not limited by the embodiments of the present disclosure. Each component shown in FIG. 1 is merely illustrative. The first device 100 can include one or more of components shown in FIG. 1 but does not necessarily have to include all the components in FIG. 1. The first device 100 shown in FIG. 1 is explanatory and is by no means intended to limit the embodiments, their applications, or purposes.

In the present embodiment, the memory 102 of the first device 100 is configured to store program instructions, which is configured to control the processor 101 to operate to execute the interaction method. The instructions can be designed according to the disclosed scheme of the present disclosure by technicians. How these instructions control the processor to operate is common knowledge in this field, thus it will not be described in detail here.

In one embodiment, as shown in FIG. 1, the second device 200 may include the processor 201 and the memory 202. The second device 200 also includes the communication apparatus 203, the display apparatus 204, the user interface 205, the camera apparatus 206, the audio/video interface 207, and the sensor 208, etc. Moreover, the second device 200 may also include the power management chip 209 and the battery 210, etc.

The second device 200 can be a mobile phone, portable computer, tablet PC, PDA, wearable device, etc., without limitation by the embodiments of the present disclosure. Each component shown in FIG. 1 is merely illustrative. The second device 200 can include one or more components shown in FIG. 1 but does not necessarily have to include all the components in FIG. 1. The second device 200 shown in FIG. 1 is only explanatory and is by no means intended to limit the embodiments, their applications, or purposes.

In the present embodiment, the memory 202 of the second device 200 is configured to store program instructions, which is configured to control the processor 201 to operate to execute the interaction method. The instructions can be designed according to the disclosed scheme of the present disclosure by technicians. How these instructions control the processor to operate is common knowledge in this field, thus it will not be described in detail here.

It should be understood that although FIG. 1 only shows one first device 100 and one second device 200, this does not imply a limitation on the respective quantities; the display system can contain a plurality of first devices 100 and a plurality of second devices 200.

In the above description, the technicians can design instructions based on the provided scheme in the present disclosure. How these instructions control the processor to operate is common knowledge in this field, thus it will not be described in detail here.

<Method Embodiment>

Figure 2:
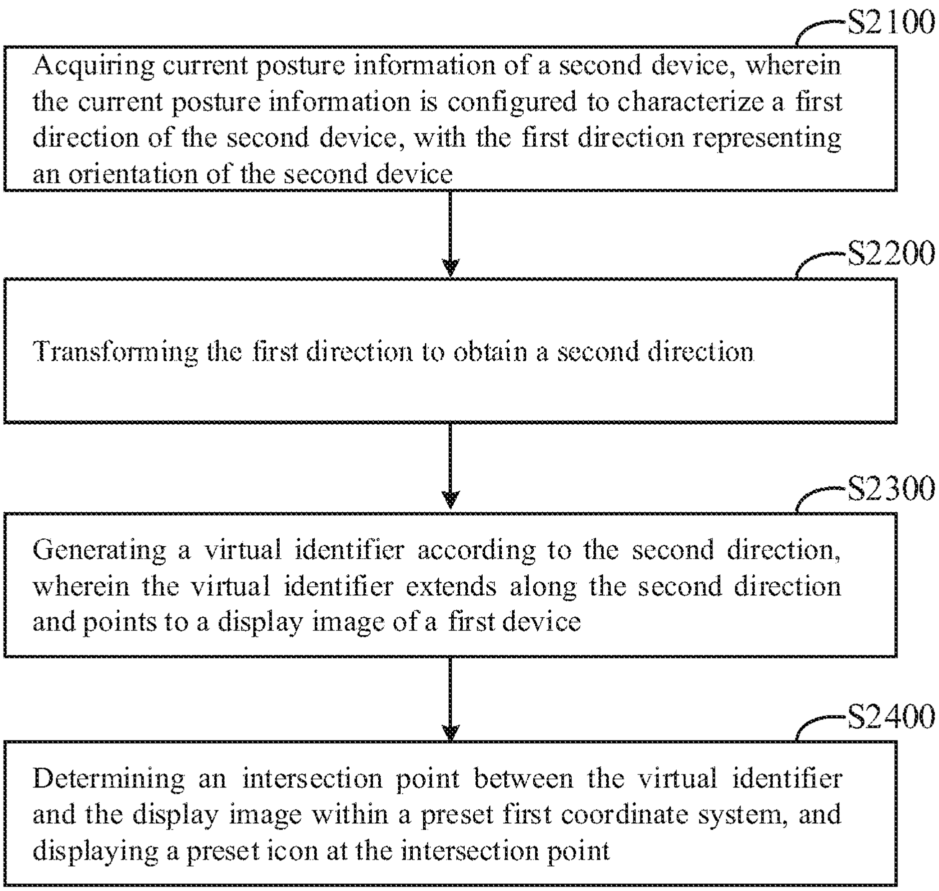
FIG. 2 is a schematic flowchart of the interaction method according to an embodiment.

The embodiments of the present disclosure provide an interaction method that may be implemented by the display system illustrated in FIG. 1. As shown in FIG. 2, the interaction method includes the following steps: step S2100 to step S2400.

Step S2100: acquiring current posture information of a second device, wherein the current posture information is configured to characterize a first direction of the second device, with the first direction representing an orientation of the second device.

In the present embodiment, during the use of the first device, the display image of the first device can be controlled using the second device. That is to say, the second device can serve as a controller, through which the user can control the display image of the first device. Herein, the first device can be a display device. More specifically, the first device could be a near-eye display device such as virtual reality glasses, augmented reality glasses, mixed reality glasses, etc. The second device may be configured to control the display image of the target application in the first device, for example, a mobile phone, portable computer, tablet PC, personal digital assistant, wearable device, etc.

Taking the first device as augmented reality glasses as an example, during the use of the first device (augmented reality glasses), the user can use the second device (e.g., a mobile terminal) as a controller, and by adjusting the current posture of the second device, thus adjust the display image of the first device according to the current posture of the second device. In other words, during the use of the first device (augmented reality glasses), the user, by rotating the second device, can control the display image of the first device by changing the orientation of the second device. For example, rotating the display image of the first device.

Herein, the current posture information of the second device can characterize the first direction, i.e., the orientation of the second device. Taking the second device as a terminal device as an example, it is usually held with one hand, meaning the top of the second device faces outward toward the user. Therefore, the first direction of the second device can specifically refer to the orientation of the top of the terminal device.

In one embodiment, the step of acquiring the current posture information of the second device can further include: acquiring the posture variation information and initial posture information of the second device, and determining the current posture information according to the posture variation information and the initial posture information.

In the present embodiment, the initial posture information is configured to characterize the posture information of the second device being in a preset initial direction. Exemplarily, the preset initial direction can be a direction perpendicular to the display image of the target application of the first device. The posture variation information is configured to characterize the posture information of variations of the second device relative to the initial direction. The posture variation information can be calculated based on data collected by the accelerometer and gyroscope sensors of the second device. The posture variation information can be, for example, the rotation matrix of the second device.

During practical implementation, based on the communication connection between the first device and the second device, the first device can acquire the initial posture information and posture variation information of the second device, and then determine the current posture information of the second device based on the initial posture information and posture variation information.

Figure 5:
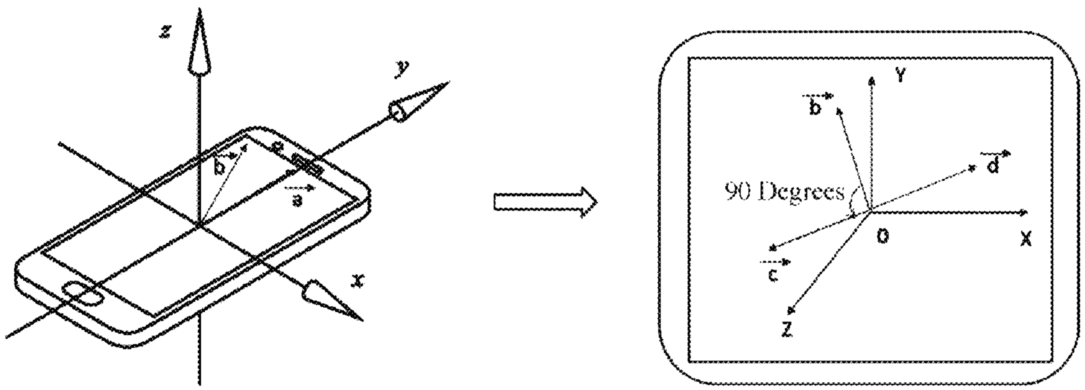
FIG. 5 is a schematic diagram of the transformation process of the first direction of the second device according to an embodiment.

Exemplarily, the initial posture of the second device indicated by the initial posture information can be the initial vector a=(0,1,0) shown in FIG. 5, i.e., the initial posture of the second device is parallel to the y-axis of the coordinate system of the second device and lies on the y-axis. Subsequently, based on the principle of rotation matrices, according to the initial posture (initial vector) and rotation matrix A of the second device, the current posture information of the second device (i.e., the rotated direction of the second device) can be determined. The rotated direction of the second device can be represented by the vector b=A*a shown in FIG. 5.

After step S2100, execute step S2200: transforming the first direction into a second direction.

In the present embodiment, the coordinate systems of the first device and the second device can be the same or different. On one hand, if the coordinate systems of the first device and the second device are different, after determining the first direction of the second device according to the current posture information of the second device, it is necessary to transform the first direction to adjust the display image of the first device according to the transformed direction. On the other hand, if the coordinate systems of the first device and the second device are the same, there might be differences in their usage directions. Thus, after determining the first direction of the second device based on the current posture information of the second device, it is also necessary to transform the first direction to adjust the display image of the first device according to the transformed direction.

Figure 3:
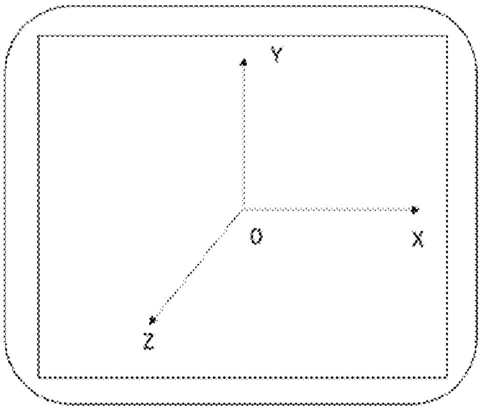
FIG. 3 is a schematic diagram of the coordinate system of a first device according to an embodiment.
Figure 4:
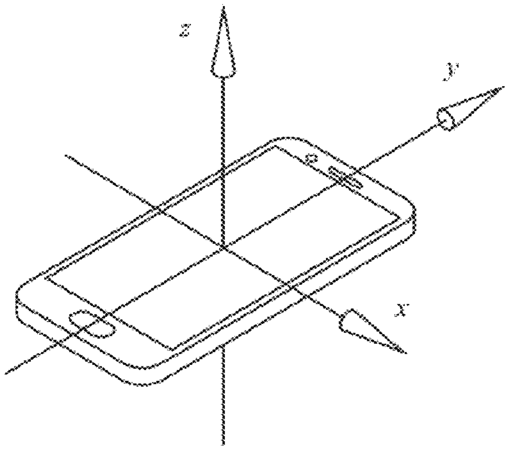
FIG. 4 is a schematic diagram of the coordinate system of a second device according to an embodiment.

Continuing with the example where the first device is the augmented reality glasses and the second device is the terminal device, both the first device and the second device adopt the Android coordinate system, which is a three-dimensional coordinate system. Please refer to FIG. 3, which shows a schematic diagram of the coordinate system of the first device, specifically, for the coordinate system of the first device (the augmented reality glasses), the origin is located at the center of the screen of the first device, and the X-axis and Y-axis lie in the plane where the screen of the first device is located, wherein the X-axis extends along the left-right direction, the Y-axis extends along the up-down direction, and the Z-axis is perpendicular to the screen of the first device. Please refer to FIG. 4, which shows a schematic diagram of the coordinate system of the second device, more specifically, for the coordinate system of the second device (terminal device), the origin is located at the center of the screen of the second device, the x-axis and y-axis lie in the plane where the screen of the second device, wherein the x-axis extends along the left-right direction, the y-axis extends along the up-down direction, and the z-axis is perpendicular to the screen of the second device. Moreover, as shown in FIG. 3, when the first device (augmented reality glasses) is in the usage status, i.e., worn, the screen of the first device is often perpendicular to the horizontal plane (earth surface). As shown in FIG. 4, when the second device (terminal device) is in the usage status, i.e., the screen of the second device (terminal device) is parallel to the horizontal plane (earth surface) and facing upwards. The indication directions of the coordinate systems of the first device (augmented reality glasses) and the second device (terminal device) in their respective usage statuses are different.

Furthermore, since the display image of the first device is a 3d of image, during the use of the first device by the user, the user can control the left and right or up and down movement of the display image of the first device to view corresponding content. That is to say, controlling the left and right movement of the display image of the first device means controlling the rotation of the display image of the first device around the Y-axis (Z-axis rotates around the Y-axis); controlling the up and down movement of the display image of the first device means controlling the rotation of the display image of the first device around the X-axis (Z-axis rotates around the X-axis).

However, when the second device (terminal device) serves as a controller, the control of the display image of the first device is achieved by rotating the second device (terminal device), such as rotating left and right or up and down. Specifically, it is generally understood that the left and right rotation of the second device (terminal device) refers to the angle at which the screen of the second device is parallel to the horizontal plane (the earth surface), that is, the angle at which the second device is rotated around the z-axis (the y-axis is rotated around the z-axis). If the current posture information of the second device (i.e., the rotation angle of the second device around the z-axis) is directly configured to control the movement of the display image of the first device, the display image of the first device will be rotated around the Z-axis, making it impossible to achieve left and right movement of the display image of the first device. Similarly, it is generally understood that the up and down rotation of the second device (terminal device) refers to the angle at which the screen of the second device is perpendicular to the horizontal plane (earth surface), i.e., the rotation angle of the second device around the x-axis (y-axis is rotated around the x-axis). If the current posture information of the second device (i.e., the rotation angle around the x-axis) is directly configured to control the movement of the display image of the first device, the display image of the first device will follow the rotation of the Y-axis around the X-axis, making it impossible to achieve up and down movement of the display image of the first device. Based on this, after acquiring the current posture information of the second device, i.e., the first direction (orientation), it is necessary to transform the first direction to achieve the function of controlling the display image of the first device by using the second device.

The following describes the transformation process of the first direction with one embodiment.

In one embodiment, the step of transforming the first direction to obtain a second direction may further include: transforming the first direction according to a preset transformation relationship to obtain the second direction; wherein the preset transformation relationship is a correspondence between a coordinate system of the first device in use and a coordinate system of the second device in use.

In the present embodiment, the first direction can be transformed based on the preset transformation relationship to obtain the second direction. If the coordinate systems of the first device and the second device are different, the preset transformation relationship can be the correspondence between the coordinate systems of the first device and the second device. For example, the coordinate system of the first device is a right-handed coordinate system (Android coordinate system), while the coordinate system of the second device is a left-handed coordinate system. If the coordinate systems of the first device and the second device are the same but their usage directions are different, the preset transformation relationship can be the correspondence between the coordinate systems of the first device and the second device in their respective usage statuses.

Continuing with the example where the first device is augmented reality glasses and the second device is a terminal device. From a visual perspective, the plane where the screen of the first device (augmented reality glasses) is located is equivalent to rotating the screen of the second device (terminal device) by 90 degrees, i.e., making the screen of the second device (terminal device) perpendicular to the earth surface. That is to say, after acquiring the current posture information (first direction) of the second device, the first direction can be rotated 90 degrees around the x-axis so that the transformed second direction (rotated direction) is perpendicular to the screen where the screen of the first device is located, thereby achieving the control on the movement of the display image of the first device based on the second direction.

Exemplarily, please refer to FIG. 5, it illustrates the process of transforming the first direction into the second direction. Specifically, for controlling the left and right movement of the display image of the first device by rotating the second device left and right, the second device is controlled to rotate at an angle parallel to the earth surface, so as to obtain the current posture information (first direction) of the second device, i.e., the first direction is vector b; subsequently, vector b is rotated 90 degrees around the x-axis towards the outside of the screen of the second device to obtain vector c; then, the component of vector c along the z-axis is negated to obtain vector d, i.e., the second direction. The second direction points towards the screen of the first device, thereby controlling the left and right movement of the display image of the first device based on the second direction. It should be understood that after obtaining vector b, vector b can be rotated 90 degrees around the x-axis towards the inside of the screen of the second device to obtain vector d, i.e., the second direction. The specific method of transforming the first direction into the second direction in the present embodiment is not limited.

Specifically, for controlling the up and down movement of the display image of the first device by rotating the second device up and down, the second device is controlled to rotate at an angle perpendicular to the earth surface, so as to acquire the current posture information (first direction) of the second device; subsequently, the vector corresponding to the first direction is rotated 90 degrees around the x-axis towards the inside of the screen of the second device to obtain the second direction. The second direction points towards the screen of the first device, thereby controlling the up and down movement of the display image of the first device based on the second direction.

In the present embodiment, according to the coordinate systems of the first device and the second device, a preset transformation relationship can be set, and the first direction can be transformed into the second direction based on the preset transformation relationship, thereby achieving the function of controlling the movement of the display image of the first device by rotating the second device. Moreover, the present embodiment does not require complex coordinate system transformations, making it possible to transform the rotation direction of the second device into the actual rotation direction of the display image of the first device with low data complexity and fast response speed.

After step S2200, execute step S2300: generating a virtual identifier according to the second direction, wherein the virtual identifier extends along the second direction and points to a display image of a first device.

Figure 6:
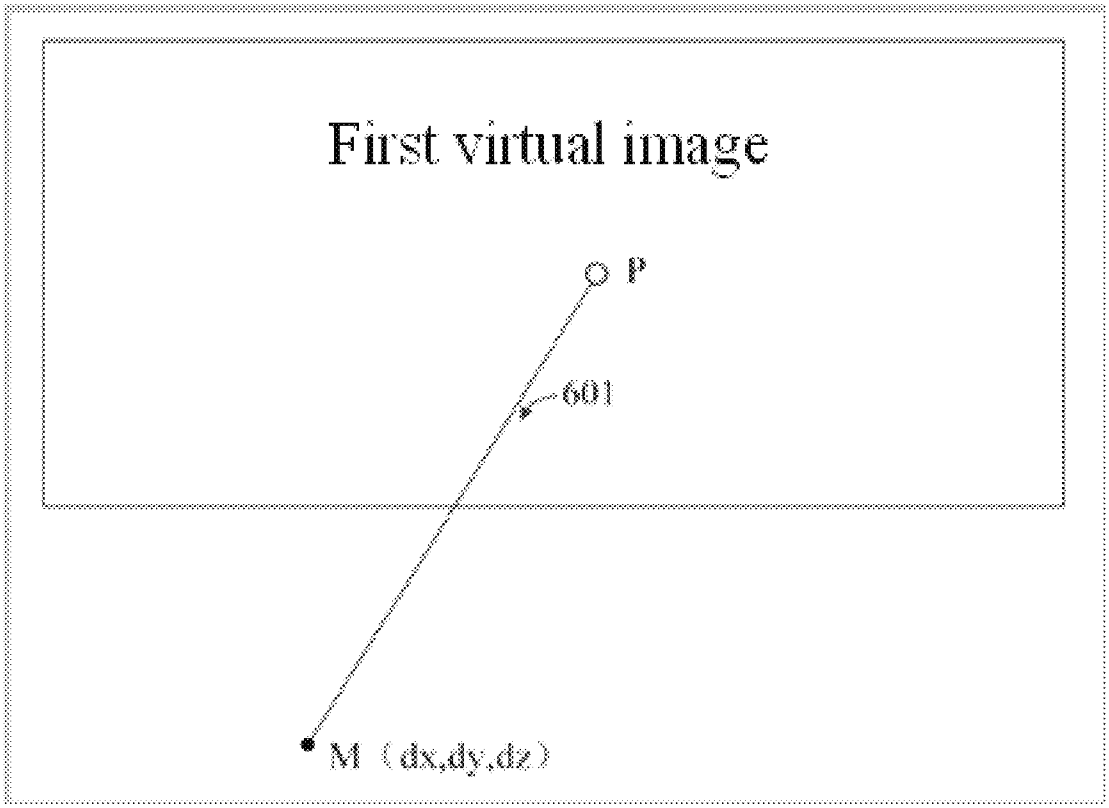
FIG. 6 is a schematic diagram of a virtual identifier according to an embodiment.

In the present embodiment, the virtual identifier can characterize the current posture of the first device. The user can control the display image of the first device based on the virtual identifier. Exemplarily, the virtual identifier can be a virtual solid line, dotted line, arrow, etc. As shown in FIG. 6, the virtual solid line 601 can be a straight line or a curve.

During practical implementation, as shown in FIG. 6, the virtual identifier is generated and displayed starting from a preset starting point M (dx, dy, dz) along the second direction. That is to say, the virtual identifier can be rotated around the preset starting point. Herein, the preset starting point M (dx, dy, dz) can characterize the head or eye of the wearer of the first device.

Moreover, the closer the preset starting point is to the display image of the first device, the greater the rotation amplitude required by the second device when using the second device to control the display image of the first device. Conversely, the farther the preset starting point is from the display image of the first device, the smaller the rotation amplitude required by the second device when using the second device to control the display image of the first device. Based on this, the distance between the preset starting point and the display image of the first device can be set according to practical experience. Furthermore, the position of the preset starting point can be set in a second coordinate system. Herein, the second coordinate system can be the spatial coordinate system of the first device.

Step S2400, determining an intersection point between the virtual identifier and the display image within a preset first coordinate system, and displaying a preset icon at the intersection point.

During practical implementation, as shown in FIG. 6, based on the principle of calculating the intersection point between a vector and a plane, calculating the intersection point P between the virtual identifier (vector d) and the XOY plane in the second coordinate system (spatial coordinate system of the first device). Then, after the display image of the first device is rendered within a preset first coordinate system, transforming the coordinates of the intersection point P from the second coordinate system (spatial coordinate system of the first device) to the preset first coordinate system (screen coordinate system of the first device), and displaying the preset icon based on the transformed coordinates. Herein, the preset icon can be a circle or "arrow".

The following provides a specific example to illustrate the process of determining the intersection point between the virtual identifier and the display image within the preset first coordinate system.

Figure 7:
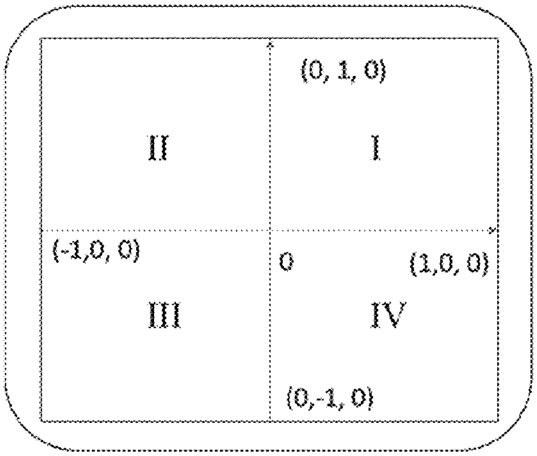
FIG. 7 is a schematic diagram of a second coordinate system according to an embodiment.

The second coordinate system (spatial coordinate system of the first device) is a three-dimensional coordinate system. As shown in FIG. 7, the second coordinate system can have its origin at the center of the screen of the first device, the X-axis extends along the width direction of the first device, the Y-axis extends along the height direction of the first device, and the Z-axis is perpendicular to the XOY plane. Herein, the uppermost side of the screen of the first device is y=1, the lowest side of the screen of the first device is y=−1, the leftmost side of the screen of the first device is x=−1, and the rightmost side of the screen of the first device is x=1.

Figure 8:
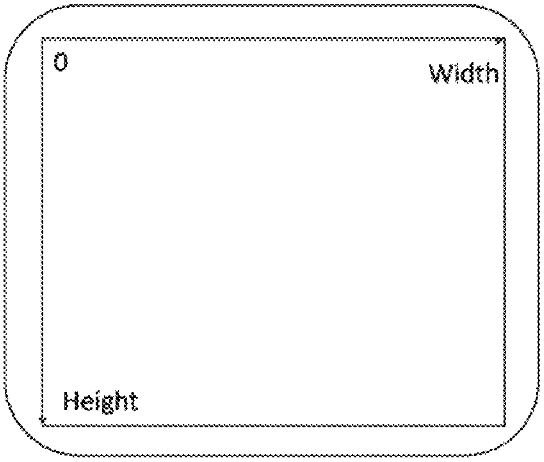
FIG. 8 is a schematic diagram of a first coordinate system according to an embodiment.

The first coordinate system (screen coordinate system of the first device) is a two-dimensional coordinate system. As shown in FIG. 8, the origin of the first coordinate system is at the upper-left corner of the screen of the first device, the horizontal axis extends along the width direction of the screen of the first device, and the vertical axis extends along the height direction of the screen of the first device. Herein, the height of the lowest side of the screen of the first device is 1, and the width of the rightmost side of the screen of the first device is 1.

Assuming that the coordinates of the intersection point P between the virtual identifier and the display image are (Px, Py, Pz) in the second coordinate system, then the coordinates after transformation in the first coordinate system are (Qx, Qy), wherein Qx=(Px+1)*Width/2, and Qy=(1−Py)*Height/2.

Figure 9A:
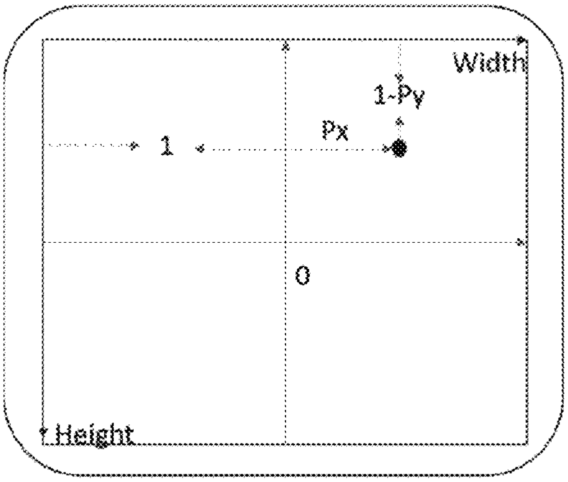
FIG. 9*a*-9*d* are schematic diagrams showing the coordinate transformation of intersection point P in different quadrants according to an embodiment.
Figure 9B:
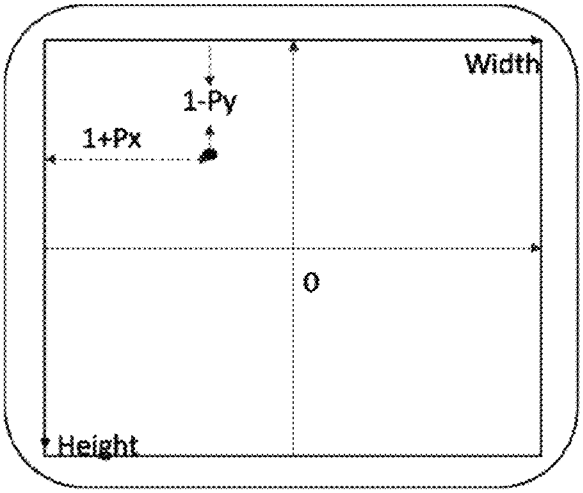
Figure 9C:
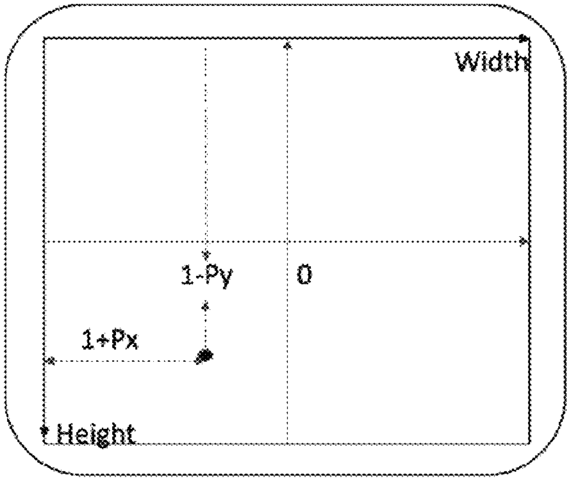
Figure 9D:
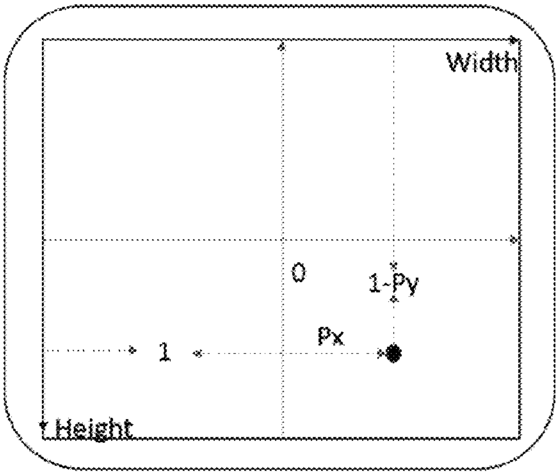

More specifically, continuing with FIG. 7, based on the second coordinate system, dividing the screen of the first device into four quadrants (quadrant I, II, III, IV). As shown in FIG. 9*a*, when the intersection point P is located in the quadrant *I*, the coordinates after transformation in the first coordinate system are (Qx, Qy), wherein Qx=(Px+1)*Width/2, and Qy=(1−Py)*Height/2. As shown in FIG. 9*b*, when the intersection point P is located in the quadrant II, the coordinates after transformation in the first coordinate system are (Qx, Qy), wherein Qx=(Px+1)*Width/2, and Qy=(1−Py)*Height/2. As shown in FIG. 9*c*, when the intersection point P is located in the quadrant III, the coordinates after transformation in the first coordinate system are (Qx, Qy), wherein Qx=(Px+1)*Width/2, and Qy=(1−Py)*Height/2. As shown in FIG. 9*d*, when the intersection point P is located in the quadrant IV, the coordinates after transformation in the first coordinate system are (Qx, Qy), wherein Qx=(Px+1)*Width/2, and Qy=(1−Py)*Height/2.

In one embodiment, after determining an intersection point between the virtual identifier and the display image within a preset first coordinate system and displaying a preset icon at the intersection point, the method can further include: acquiring first location information of the intersection point upon receiving a control instruction; and executing an interaction event triggered by the intersection point according to the first location information.

In the present embodiment, the control instruction can be a instruction which is generated by the user operating the display image of the first device and configured to trigger an interaction event at the location of the intersection point. The control instruction is configured to trigger the first device to acquire the first location information, i.e., the location information of the intersection point between the virtual identifier and the display image of the first device. The interaction event can be a click event, long-press event, drag-and-drop event, and so on.

According to an embodiment of the present disclosure, by acquiring current posture information characterizing a first direction of the second device, transforming the first direction to obtain a second direction, generating and displaying a virtual identifier according to the second direction, determining an intersection point between the virtual identifier and the display image within a preset first coordinate system, and displaying a preset icon at the intersection point, in this way, it is possible to transform a user's operation on the second device into an actual rotation operation on the display image of the first device, enabling control of the display image of the first device via the second device. Moreover, by simulating the second device as a mouse for controlling the display image of the first device, usage becomes more convenient. Furthermore, embodiments of the present disclosure are not dependent on any specific scenario, allowing for global use and a broader range of applications.

In one embodiment, when a wireless streaming function is enabled, the display image of the first device corresponds to a display interface of the second device.

In the present embodiment, by utilizing the wireless streaming function of the second device to use the second device as an extended screen to display the image content of the first device, it is possible to achieve a higher-quality display image and to convert the operations of the user on the virtual image displayed by the second device into actual operations on the display image of the first device, thereby expanding the functionality of the second device and enhancing the user experience.

<Apparatus Embodiment>

Figure 10:
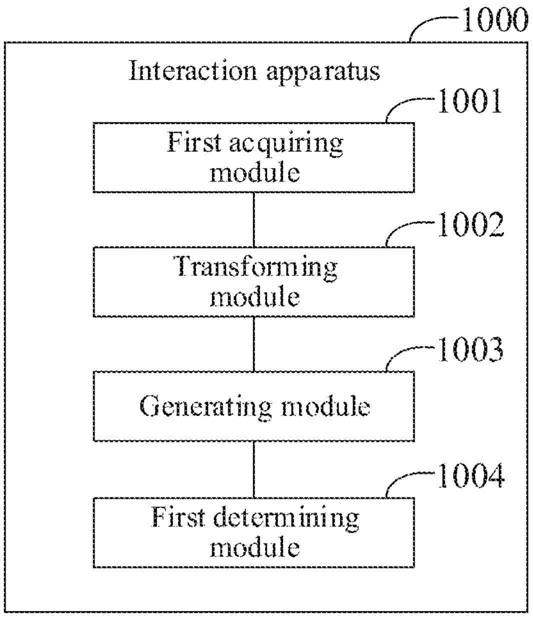
FIG. 10 is a schematic diagram of the hardware structure of an interaction apparatus according to an embodiment.

Embodiments of the present disclosure provide an interaction apparatus. As shown in FIG. 10, the interaction apparatus 1000 can include a first acquiring module 1001, a transforming module 1002, a generating module 1003, and a first determining module 1004.

The first acquiring module 1001 is configured for acquiring current posture information of a second device, wherein the current posture information is configured to characterize a first direction of the second device, with the first direction representing an orientation of the second device.

The transforming module 1002 is configured for transforming the first direction to obtain a second direction.

The generating module 1003 is configured for generating a virtual identifier according to the second direction, wherein the virtual identifier extends along the second direction and points to a display screen of a first device.

The first determining module 1004 is configured for determining an intersection point between the virtual identifier and the display screen within a preset first coordinate system, and displaying a preset icon at the intersection point.

In one embodiment, the apparatus further includes:

a second acquiring module for acquiring first location information of the intersection point upon receiving a control instruction;

an executing module for executing an interaction event triggered by the intersection point according to the first location information.

In one embodiment, when the wireless streaming function is enabled, the display image of the first device corresponds to the display interface of the second device.

In one embodiment, the first acquiring module is specifically configured for:

acquiring posture variation information and initial posture information of the second device, wherein the initial posture information is configured to characterize posture information of the second device being in a preset initial direction, and the posture variation information is configured to characterize posture information of variations of the second device relative to the initial direction; and determining the current posture information according to the posture variation information and the initial posture information.

In one embodiment, the transforming module is specifically configured for: transforming the first direction according to a preset transformation relationship to obtain the second direction;

wherein the preset transformation relationship is a correspondence between a coordinate system of the first device in use and a coordinate system of the second device in use.

According to the embodiments of the present disclosure, by acquiring current posture information characterizing a first direction of the second device, transforming the first direction to obtain a second direction, generating and displaying a virtual identifier according to the second direction, determining an intersection point between the virtual identifier and the display image within a preset first coordinate system, and displaying a preset icon at the intersection point, in this way, it is possible to transform a user's operation on the second device into an actual rotation operation on the display image of the first device, enabling control of the display image of the first device via the second device. Moreover, by simulating the second device as a mouse for controlling the display image of the first device, usage becomes more convenient. Furthermore, embodiments of the present disclosure are not dependent on any specific scenario, allowing for global use and a broader range of applications.

<Device Embodiment>

Figure 11:
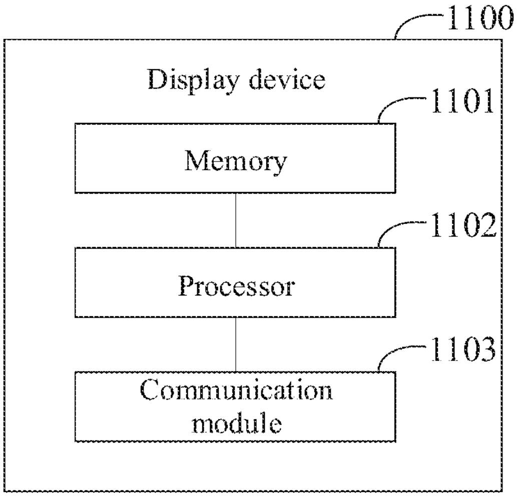
FIG. 11 is a schematic diagram of the hardware structure of a display device according to an embodiment.

FIG. 11 is a schematic diagram of the hardware structure of a display device according to an embodiment. As shown in FIG. 11, the display device 1100 includes a memory 1101, a processor 1102, and a communication module 1103.

The memory 1101 may be configured for storing executable computer instructions.

The processor 1102 may be configured for executing the interaction method according to the method embodiment of the present disclosure under control of the executable computer instructions.

The communication module is configured for establishing a communication connection with an electronic device.

In one embodiment, the display device can be, for example, VR glasses, AR glasses, MR glasses, etc. The electronic device can be, for example, a mobile phone, portable computer, tablet PC, personal digital assistant, wearable device, etc.

In another embodiment, the near-eye display device 1100 may include the above interaction apparatus 1000.

In one embodiment, the modules of the above interaction apparatus 1000 can be implemented by the processor 1102 running the computer instructions stored in the memory 1101.

According to an embodiment of the present disclosure, by acquiring current posture information characterizing a first direction of the second device, transforming the first direction to obtain a second direction, generating and displaying a virtual identifier according to the second direction, determining an intersection point between the virtual identifier and the display image within a preset first coordinate system, and displaying a preset icon at the intersection point, in this way, it is possible to transform a user's operation on the second device into an actual rotation operation on the display image of the first device, enabling control of the display image of the first device via the second device. Moreover, by simulating the second device as a mouse for controlling the display image of the first device, usage becomes more convenient. Furthermore, embodiments of the present disclosure are not dependent on any specific scenario, allowing for global use and a broader range of applications.

<Computer-Readable Storage Medium>

Embodiments of the present disclosure further provide a computer-readable storage medium on which computer instructions are stored. When these computer instructions are run by a processor, the interaction method provided by the embodiments of the present disclosure is executed.

Embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments of the present disclosure may be assembler instructions, instruction-set-architecture (ISA) instructions, machine instructions, machine dependent instructions, microcode, firmware instructions, state-setting data, or either source code or object code written in any combination of one or more programming languages, comprising an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, comprising a local area network (LAN) or a wide area network (WAN), or the connection may be made to an external computer (for example, through the Internet using an Internet Service Provider). In some embodiments, electronic circuitry comprising, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments of the present disclosure.

Aspects of the embodiments of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture comprising instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent.

Embodiments of the present disclosure have been presented for purposes of illustration, but are not intended to be exhaustive or limited to the embodiments disclosed. Numerous modifications and changes will be apparent to those skilled in the art without departing from the scope and spirit of the illustrated embodiments. The terminology used herein was chosen to best explain the principles of the embodiments, the practical application or technical improvement over technologies found in the marketplace, or to enable others of ordinary skill in the art to understand the embodiments disclosed herein. The scope of the embodiments of the present disclosure is defined by the appended claims.

The invention claimed is:

1. An interaction method between a first device having a preset first coordinate system and a second device having a second coordinate system, comprising:

acquiring posture information of the second device, wherein the posture information is configured to characterize a first direction representing an orientation of the second device, wherein in the second coordinate system of the second device, an x-axis extends along a left-right direction, a y-axis extends along an up-down direction, and a z-axis is perpendicular to a screen of the second device, and wherein the posture information comprises a first vector having the first direction;

transforming the first direction to obtain a second direction, wherein the first vector is rotated 90 degrees around the x-axis towards outside of the screen of the second device to obtain a second vector; and then, a component of the second vector along the z-axis is negated to obtain the second direction, the second direction pointing towards the first screen of the first device;

generating a virtual identifier according to the second direction, wherein the virtual identifier extends along the second direction and points to a display image of the first device; and determining an intersection point between the virtual identifier and the display image within the preset first coordinate system and displaying a preset icon at the intersection point.

2. The method according to claim 1, wherein after said determining an intersection point between the virtual identifier and the display image within the preset first coordinate system, and displaying a preset icon at the intersection point, the method further comprises:

acquiring first location information of the intersection point upon receiving a control instruction; and executing an interaction event triggered by the intersection point according to the first location information.

3. The method according to claim 1, wherein said acquiring posture information of a second device, comprises:

acquiring posture variation information and initial posture information of the second device, wherein the initial posture information is configured to characterize posture information of the second device being in a preset initial direction, and the posture variation information is configured to characterize posture information of variations of the second device relative to the initial direction; and determining the posture information according to the posture variation information and the initial posture information.

4. The method according to claim 1, wherein said transforming the first direction to obtain a second direction, comprises:

transforming the first direction according to a preset transformation relationship to obtain the second direction;

wherein the preset transformation relationship is a correspondence between a coordinate system of the first device in use and a coordinate system of the second device in use.

5. A display device, comprising:

a memory for storing executable computer instructions; and a processor, communicatively coupled to a communication module and the memory, for executing the interaction method according to claim 1 under the executable computer instructions stored in the memory.

6. The method according to claim 1, wherein the preset first coordinate system is a screen coordinate system of the first device, a first origin of the preset first coordinate system is at an upper-left corner of a first screen of the first device, wherein a third coordinate system is a spatial coordinate system of the first device, a third origin is at a center of the first screen of the first device, and wherein calculating coordinates of an intersection point P between a virtual identifier and a display image in the third coordinate system, and transforming the coordinates to second coordinates in the preset first coordinate system.

7. An interaction apparatus between a first device having a preset first coordinate system and a second device having a second coordinate system, comprising a processor which is configured to:

acquiring posture information of the second device, wherein the posture information is configured to characterize a first direction representing an orientation of the second device, wherein in the second coordinate system of the second device, a second origin is located at a center of the second screen of the second device, x-axis extends along a left-right direction, y-axis extends along an up-down direction, and z-axis is perpendicular to the second screen of the second device, and wherein the posture information comprises a first vector having the first direction;

transforming the first direction to obtain a second direction, wherein the first vector is rotated 90 degrees around the x-axis towards outside of the screen of the second device to obtain a second vector; then, a component of the second vector along the z-axis is negated to obtain the second direction, the second direction points towards the first screen of the first device;

generate a virtual identifier according to the second direction, wherein the virtual identifier extends along the second direction and points to a display image of the first device; and determining an intersection point between the virtual identifier and the display image within the preset first coordinate system and displaying a preset icon at the intersection point.

8. The apparatus according to claim 7, wherein the processor is further configured to acquire first location information of the intersection point upon receiving a control instruction; and execute an interaction event triggered by the intersection point according to the first location information.

9. The apparatus according to claim 7, wherein the processor is further configured to acquire posture variation information and initial posture information of the second device, wherein the initial posture information is configured to characterize posture information of the second device being in a preset initial direction, and the posture variation information is configured to characterize posture information of variations of the second device relative to the initial direction; and determine the posture information according to the posture variation information and the initial posture information.

10. The apparatus according to claim 7, wherein the processor is further configured to transform the first direction according to a preset transformation relationship to obtain the second direction;

wherein the preset transformation relationship is a correspondence between a coordinate system of the first device in use and a coordinate system of the second device in use.

11. The apparatus according to claim 7, wherein the preset first coordinate system is a screen coordinate system of the first device, a first origin of the preset first coordinate system is at an upper-left corner of a first screen of the first device, wherein a third coordinate system is a spatial coordinate system of the first device, a third origin is at a center of the first screen of the first device, and wherein coordinates of an intersection point P between a virtual identifier and a display image are obtained by calculating in the third coordinate system, is transform to second coordinates in the preset first coordinate system.

* * * * *